United States Patent
Miyashita et al.

(10) Patent No.: US 12,174,076 B2
(45) Date of Patent: Dec. 24, 2024

(54) TEMPERATURE MEASUREMENT SYSTEM AND MANUFACTURING METHOD THEREFOR

(71) Applicant: Mitsubishi Electric Corporation, Tokyo (JP)

(72) Inventors: Masahiro Miyashita, Tokyo (JP); Kazushi Sekine, Tokyo (JP); Sohei Samejima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 503 days.

(21) Appl. No.: 17/624,582

(22) PCT Filed: Jul. 30, 2019

(86) PCT No.: PCT/JP2019/029799
§ 371 (c)(1),
(2) Date: Jan. 4, 2022

(87) PCT Pub. No.: WO2021/019678
PCT Pub. Date: Feb. 4, 2021

(65) Prior Publication Data
US 2022/0260429 A1    Aug. 18, 2022

(51) Int. Cl.
*G01K 1/143* (2021.01)
*G01K 11/32* (2021.01)
*G01K 11/3206* (2021.01)

(52) U.S. Cl.
CPC .............. *G01K 1/143* (2013.01); *G01K 11/32* (2013.01); *G01K 11/3206* (2013.01)

(58) Field of Classification Search
CPC ..... G01K 1/143; G01K 11/32; G01K 11/3206
See application file for complete search history.

(56) References Cited

U.S. PATENT DOCUMENTS 5,829,659 A * 11/1998 Mansfield ................ G02B 6/25
225/5
6,974,261 B1 * 12/2005 McKinley ............ G02B 6/4244
385/88

(Continued)

FOREIGN PATENT DOCUMENTS

JP    2002-317451 A    10/2002
JP    2004-101471 A     4/2004

(Continued)

OTHER PUBLICATIONS

International Search Report and Written Opinion mailed on Oct. 29, 2019, received for PCT Application PCT/JP2019/029799, Filed on Jul. 30, 2019, 10 pages including English Translation.

*Primary Examiner* — Tran M. Tran
*Assistant Examiner* — Philip L Cotey
(74) *Attorney, Agent, or Firm* — XSENSUS LLP

(57) ABSTRACT

To provide a temperature measurement system, which is capable of preventing distortion that occurs in a temperature measurement object from being transmitted to an optical fiber, and improving responsiveness of heat transfer from the temperature measurement object to the optical fiber. The temperature measurement system includes: a temperature measurement object; an optical fiber provided on the temperature measurement object; an intermediate material provided on the optical fiber; and a pressing jig which is provided on the temperature measurement object, and is configured to press the optical fiber against the temperature measurement object through intermediation of the intermediate material, wherein the optical fiber is expandable and contractible in a longitudinal direction of the optical fiber due to a change in a temperature of the optical fiber with respect to the temperature measurement object and the intermediate material.

20 Claims, 10 Drawing Sheets

(56) References Cited

U.S. PATENT DOCUMENTS

| | | | |
|---|---|---|---|
| 10,837,805 B2* | 11/2020 | Godfrey | G01L 1/243 |
| 2004/0061628 A1* | 4/2004 | Hill | G08G 1/02 |
| | | | 340/933 |
| 2004/0105618 A1* | 6/2004 | Lee | G02B 6/0218 |
| | | | 385/37 |
| 2004/0184737 A1* | 9/2004 | Oono | G02B 6/4231 |
| | | | 385/52 |
| 2005/0226566 A1* | 10/2005 | Sasaki | G02B 6/3806 |
| | | | 385/39 |
| 2009/0279583 A1* | 11/2009 | Hampson | G01K 1/14 |
| | | | 374/131 |
| 2011/0079930 A1* | 4/2011 | Saito | G02B 6/3846 |
| | | | 264/1.25 |
| 2013/0034324 A1* | 2/2013 | Laing | B29C 65/4835 |
| | | | 374/161 |
| 2013/0253490 A1* | 9/2013 | Bitzer | A61B 18/1492 |
| | | | 356/32 |
| 2014/0241677 A1* | 8/2014 | Sutehall | G02B 6/4436 |
| | | | 385/104 |
| 2016/0109303 A1* | 4/2016 | Sekine | G01D 5/35316 |
| | | | 374/162 |
| 2016/0169807 A1* | 6/2016 | Uno | G02B 6/4432 |
| | | | 356/73.1 |
| 2017/0292862 A1* | 10/2017 | Godfrey | G01K 11/32 |
| 2018/0100773 A1* | 4/2018 | Guo | G01K 11/3206 |
| 2021/0010874 A1* | 1/2021 | Lee | G01K 11/3206 |

FOREIGN PATENT DOCUMENTS

| | | |
|---|---|---|
| JP | 2005-134199 A | 5/2005 |
| JP | 2006-47154 A | 2/2006 |
| JP | 2012-21939 A | 2/2012 |
| JP | 2016-13667 A | 1/2016 |
| JP | 6265213 B2 | 1/2018 |
| JP | 2019-109057 A | 7/2019 |
| WO | 2015/044998 A1 | 4/2015 |

* cited by examiner

TEMPERATURE MEASUREMENT SYSTEM AND MANUFACTURING METHOD THEREFOR

CROSS-REFERENCE TO RELATED APPLICATION

The present application is based on PCT filing PCT/JP2019/029799, filed Jul. 30, 2019 the entire contents of which are incorporated herein by reference.

TECHNICAL FIELD

This invention relates to a temperature measurement system including an optical fiber provided on a temperature measurement object, and to a manufacturing method therefor.

BACKGROUND ART

Hitherto, there has been known a temperature measurement system including a temperature measurement object, an optical fiber, an accommodating tube in which the optical fiber is accommodated, and a conductive viscous material filled in the accommodating tube, in which the accommodating tube is fixed to the temperature measurement object. The optical fiber is supported on the accommodating tube through intermediation of the conductive viscous material. With this, when distortion due to a change in temperature occurs in the temperature measurement object, the distortion that occurs in the temperature measurement object is prevented from being transmitted to the optical fiber (see, for example, Patent Literature 1).

CITATION LIST

Patent Literature

[PTL 1] JP 2004-101471 A

SUMMARY OF INVENTION

Technical Problem

However, the optical fiber is supported on the accommodating tube through intermediation of the conductive viscous material. With this, the optical fiber is movable inside the accommodating tube in a direction in which a distance between the optical fiber and the temperature measurement object changes. Thus, for example, when the accommodating tube is fixed to a lower surface of the temperature measurement object, the optical fiber is significantly separated away from the temperature measurement object due to the gravity as compared to a case in which the accommodating tube is fixed to an upper surface of the temperature measurement object. In this case, there is a problem in that responsiveness of heat transfer from the temperature measurement object to the optical fiber is deteriorated.

This invention has been made to solve the problem as described above, and has an object to provide a temperature measurement system and a manufacturing method therefor, which are capable of preventing distortion that occurs in a temperature measurement object from being transmitted to an optical fiber, and improving responsiveness of heat transfer from the temperature measurement object to the optical fiber.

Solution to Problem

According to this invention, there is provided a temperature measurement system, including: a temperature measurement object; an optical fiber provided on the temperature measurement object; an intermediate material provided on the optical fiber; and a pressing jig which is provided on the temperature measurement object, and is configured to press the optical fiber against the temperature measurement object through intermediation of the intermediate material, wherein the optical fiber is expandable and contractible in a longitudinal direction of the optical fiber due to a change in a temperature of the optical fiber with respect to the temperature measurement object and the intermediate material.

According to this invention, there is provided a manufacturing method for a temperature measurement system, including: a temporary fixing step of temporarily fixing an optical fiber to a temperature measurement object using a temporary fixing member; a holding step of pressing, by a pressing jig, the optical fiber against the temperature measurement object through intermediation of an intermediate material by mounting the pressing jig to the temperature measurement object after the temporary fixing step; and a temporary-fixing releasing step of releasing the temporary fixing of the optical fiber to the temperature measurement object by the temporary fixing member after the holding step, wherein, in the holding step, the optical fiber is expandable and contractible in a longitudinal direction of the optical fiber due to a change in a temperature of the optical fiber with respect to the temperature measurement object and the intermediate material.

Advantageous Effects of Invention

According to the temperature measurement system and the manufacturing method therefor of this invention, it is possible to prevent distortion that occurs in the temperature measurement object from being transmitted to the optical fiber, and to improve responsiveness of heat transfer from the temperature measurement object to the optical fiber.

DESCRIPTION OF EMBODIMENTS

First Embodiment

Figure 1:
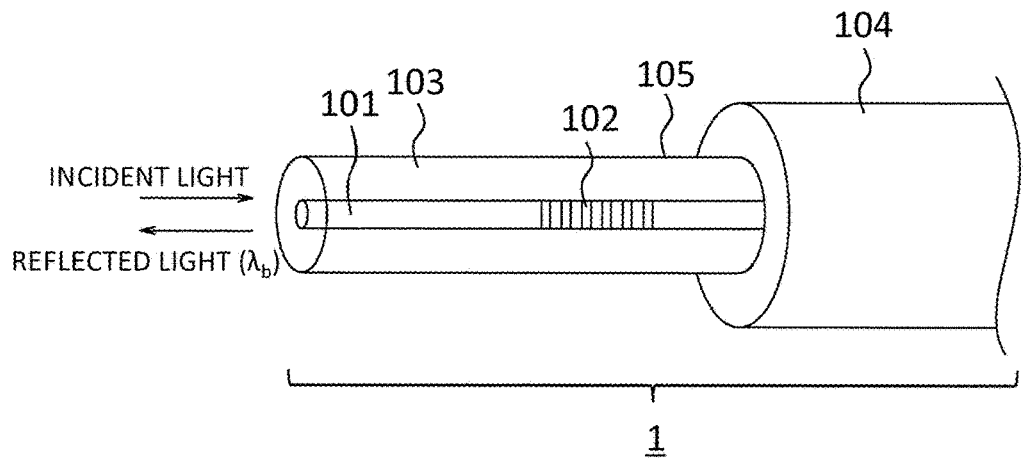
FIG. 1 is a configuration view for illustrating an optical fiber.

First, an optical fiber being one of components of a temperature measurement system according to a first embodiment is described. FIG. 1 is a configuration view for illustrating the optical fiber. Examples of an optical fiber 1 include a multipoint optical fiber 1 and a distributed optical fiber 1. In the multipoint optical fiber 1, temperature is measured at a plurality of set points in one optical fiber 1. In the distributed optical fiber 1, the temperature is continuously measured in one optical fiber 1. Light of a broadband frequency or scattering light is used for measurement of the temperature using the optical fiber 1. Examples of the scattering light include Rayleigh scattering light, Brillouin scattering light, and Raman scattering light.

In the first embodiment, the optical fiber 1 in which a fiber Bragg grating (FBG) is used as a sensor unit is described.

The optical fiber 1 includes a core 101, an FBG sensor unit 102 provided to the core 101, a cladding 103 covering an outer periphery of the core 101, and a covering portion 104 covering an outer periphery of the cladding 103. The FBG sensor unit 102 is used for measuring the temperature using a relationship between a Bragg wavelength and the temperature. The FBG sensor unit 102 is arranged inside the core 101. Examples of a material forming the covering portion 104 include an acrylate resin and a polyimide resin.

The covering portion 104 has a cover removed portion 105 in which the outer periphery of the cladding 103 is exposed. The cover removed portion 105 is formed in a region of the covering portion 104 which corresponds to the FBG sensor unit 102 in a radial direction of the optical fiber 1. Thus, a portion of the optical fiber 1 in which the FBG sensor unit 102 is arranged has a radial dimension smaller than that of other portions of the optical fiber 1.

A radial dimension of a portion of the optical fiber 1 in which the covering portion 104 is provided is 250 μm. A radial dimension of the cladding 103 is 125 μm. A radial dimension of the core 101 is 10 μm. The FBG sensor unit 102 is arranged in a range of about 5 mm in the core 101 in a longitudinal direction of the optical fiber 1.

Figure 2:
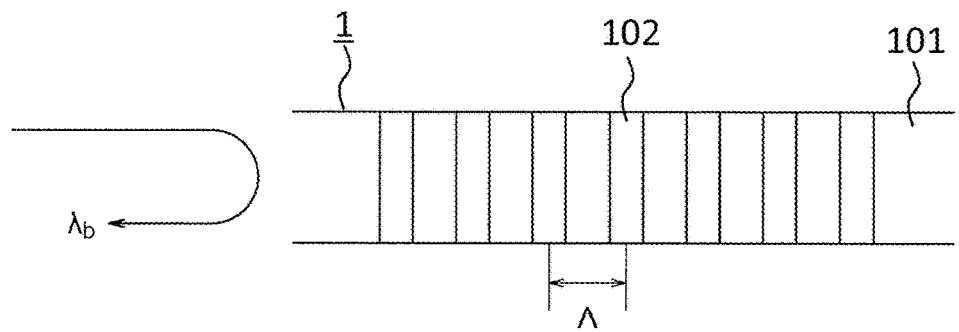
FIG. 2 is a configuration view for illustrating an FBG sensor unit of FIG. 1.

The FBG sensor unit 102 is obtained by forming a portion having cyclically modulated refractive index in the core 101. In the FBG sensor unit 102, a steep reflection spectrum characteristic is obtained. FIG. 2 is a configuration view for illustrating the FBG sensor unit 102 of FIG. 1. In the FBG sensor unit 102, a refractive index of the core 101 changes at a cycle Λ.

Figure 3:
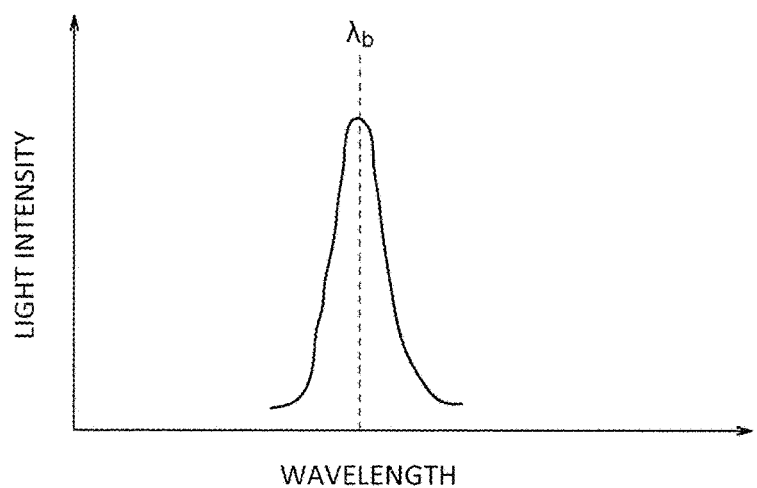
FIG. 3 is a graph for showing characteristics of a reflection spectrum obtained in the FBG sensor unit of FIG. 2.

FIG. 3 is a graph for showing characteristics of a reflection spectrum obtained in the FBG sensor unit 102 of FIG. 2. In the FBG sensor unit 102, a steep reflection spectrum is obtained. The light intensity is the largest at a center wavelength in the obtained reflection spectrum. The center wavelength of the reflection spectrum is a Bragg wavelength $\Delta_b$.

The relationship of the Bragg wavelength $\Delta_b$, the cycle Λ, and a refractive index "n" is represented by Expression (1) below.

$$\Delta_b = 2n\Lambda \quad (1)$$

The refractive index "n" changes depending on the temperature of the optical fiber 1. The cycle Λ changes depending on the temperature of the optical fiber 1 and distortion transmitted from a temperature measurement object to the optical fiber 1. Thus, when the distortion of the temperature measurement object is not transmitted to the optical fiber 1, a relationship between the Bragg wavelength $\Delta_b$ and temperature is measured in advance, and the temperature of the temperature measurement object is measured using the measured relationship and the Bragg wavelength $\Delta_b$.

Figure 4:
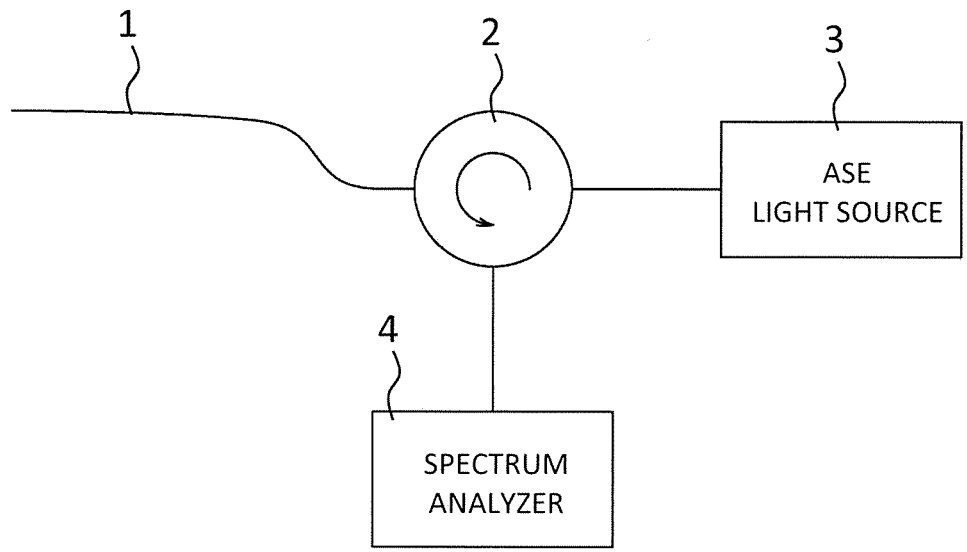
FIG. 4 is a configuration diagram for illustrating a temperature measurement system including the optical fiber of FIG. 1.

Next, the temperature measurement system is described. FIG. 4 is a configuration diagram for illustrating the temperature measurement system including the optical fiber 1 of FIG. 1. The temperature measurement system includes the optical fiber 1, an optical circulator 2, an amplified spontaneous emission (ASE) light source 3, and a spectrum analyzer 4.

The optical circulator 2 is connected to an end portion of the optical fiber 1 in the longitudinal direction. The optical circulator 2 converts an optical path passing through the optical circulator 2.

The ASE light source 3 emits light of a relatively broadband frequency. The ASE light source 3 is connected to the optical circulator 2. The light emitted from the ASE light source 3 is input to the optical circulator 2.

The spectrum analyzer 4 is a wavelength measurement device. The spectrum analyzer 4 is connected to the optical circulator 2. The light is input to the spectrum analyzer 4 via the optical circulator 2.

In the temperature measurement system, the spectrum analyzer 4 measures the Bragg wavelength $\Delta_b$ so that the temperature of the temperature measurement object is measured.

Figure 5:
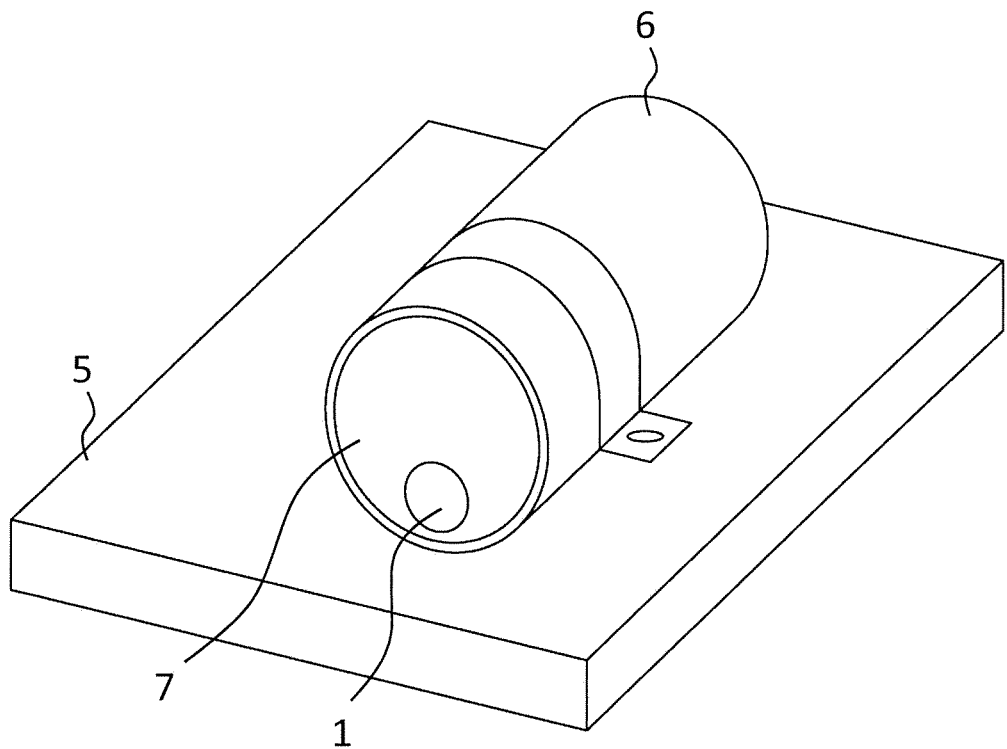
FIG. 5 is a perspective view for illustrating a related-art temperature measurement system.

Next, problems in a related-art temperature measurement system are described. FIG. 5 is a perspective view for illustrating the related-art temperature measurement system. The related-art temperature measurement system includes a temperature measurement object 5, the optical fiber 1, a protective tube 6, and a conductive viscous material 7.

The optical fiber 1 is accommodated in the protective tube 6. The protective tube 6 is filled with the conductive viscous material 7. With this, the conductive viscous material 7 is arranged around the optical fiber 1. The protective tube 6 is fixed to the temperature measurement object 5.

Figure 6:
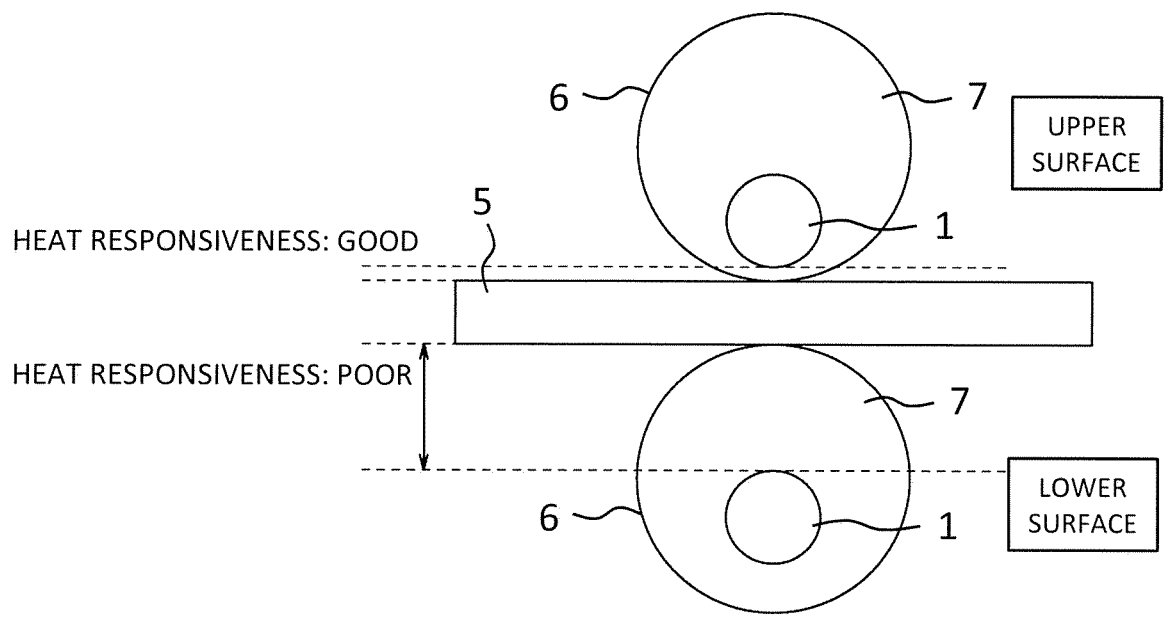
FIG. 6 is an explanatory view for illustrating responsiveness of heat transfer in the temperature measurement system of FIG. 5.

FIG. 6 is an explanatory view for illustrating responsiveness of heat transfer in the temperature measurement system of FIG. 5. In FIG. 6, a case in which the protective tube 6 is fixed to an upper surface of the temperature measurement object 5 and a case in which the protective tube 6 is fixed to a lower surface of the temperature measurement object 5 are illustrated.

As compared to the case in which the protective tube 6 is fixed to the upper surface of the temperature measurement object 5, in the case in which the protective tube 6 is fixed to the lower surface of the temperature measurement object 5, the optical fiber 1 is significantly separated away from the temperature measurement object 5 due to the gravity acting on the optical fiber 1. As a result, as compared to the case in which the protective tube 6 is fixed to the upper surface of the temperature measurement object 5, in the case in which the protective tube 6 is fixed to the lower surface of the temperature measurement object 5, the responsiveness of the heat transfer from the temperature measurement object 5 to the optical fiber 1 is deteriorated. In other words, the responsiveness of the heat transfer in the temperature measurement system is deteriorated.

Figure 7:
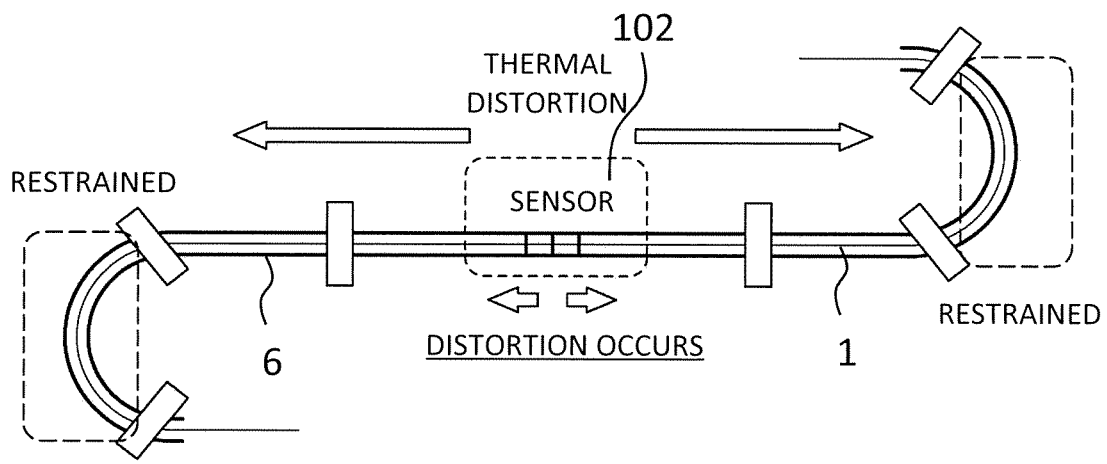
FIG. 7 is a view for illustrating a protective tube and the optical fiber when a radial dimension of the protective tube of FIG. 5 is reduced so that the optical fiber does not move in a radial direction with respect to the protective tube.

In order to suppress the deterioration of the responsiveness of the heat transfer in the temperature measurement system, it is conceivable that a radial dimension of the protective tube 6 is reduced to prevent movement of the optical fiber 1 in the radial direction with respect to the protective tube 6. FIG. 7 is a view for illustrating the protective tube 6 and the optical fiber 1 when the radial dimension of the protective tube 6 of FIG. 5 is reduced so that the optical fiber 1 does not move in the radial direction with respect to the protective tube 6. When the optical fiber 1 does not move in the radial direction with respect to the protective tube 6, the protective tube 6 is bent so that the optical fiber 1 is restrained at the bent portion of the protective tube 6. With this, distortion is transmitted to the FBG sensor unit 102 from the temperature measurement object 5. As a result, the temperature measurement accuracy of the temperature measurement system is deteriorated.

Figure 8:
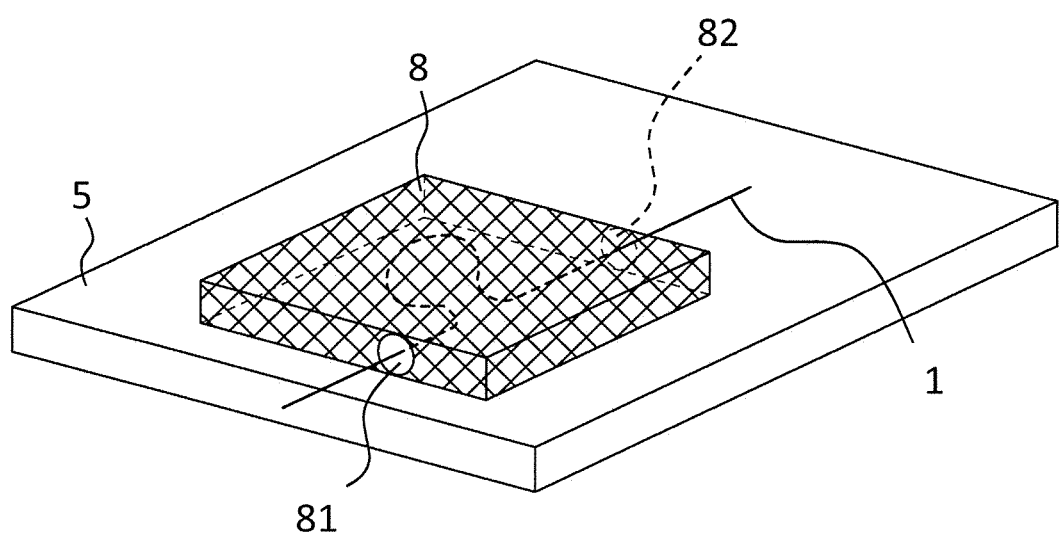
FIG. 8 is a perspective view for illustrating another related-art temperature measurement system.

FIG. 8 is a perspective view for illustrating another related-art temperature measurement system. The another related-art temperature measurement system includes the temperature measurement object 5, the optical fiber 1, a casing 8, and the conductive viscous material.

The optical fiber 1 is accommodated in the casing 8. The casing 8 is filled with the conductive viscous material. With this, the conductive viscous material is arranged around the optical fiber 1. The casing 8 is fixed to the temperature measurement object 5.

The optical fiber 1 is arranged to be bent into a Ω shape inside the casing 8. The casing 8 has an inlet portion 81 and an outlet portion 82 through which the optical fiber 1 is inserted. In the inlet portion 81 and the outlet portion 82, the optical fiber 1 is fixed to the casing 8. Inside the casing 8, the optical fiber 1 is not fixed to the casing 8. Thus, distortion from the temperature measurement object 5 is not transmitted to the optical fiber 1.

However, the optical fiber 1 is bent into the Ω shape, and hence a portion of the temperature measurement object 5 which is measured in temperature is limited. In other words, a space in the temperature measurement object 5 in which the optical fiber 1 is not arranged becomes larger. As a result, the density of the portion which is measured in temperature by the temperature measurement system is reduced.

In the related-art temperature measurement system, a relationship between Brillouin scattering light and temperature is measured in advance, and the temperature of the temperature measurement object 5 is measured from new Brillouin scattering light using the measured relationship.

In view of the above discussion, the inventors of the present invention have focused on a problem in that, in the related-art temperature measurement system, the temperature cannot be measured with high accuracy and high density without deteriorating the responsiveness of the heat transfer.

In order to solve the problem newly focused as described above, the first embodiment provides a temperature measurement system and a manufacturing method therefor in which the optical fiber 1 can be freely wired without deteriorating the responsiveness of the heat transfer, and the temperature can be measured with high accuracy and high density.

Figure 9:
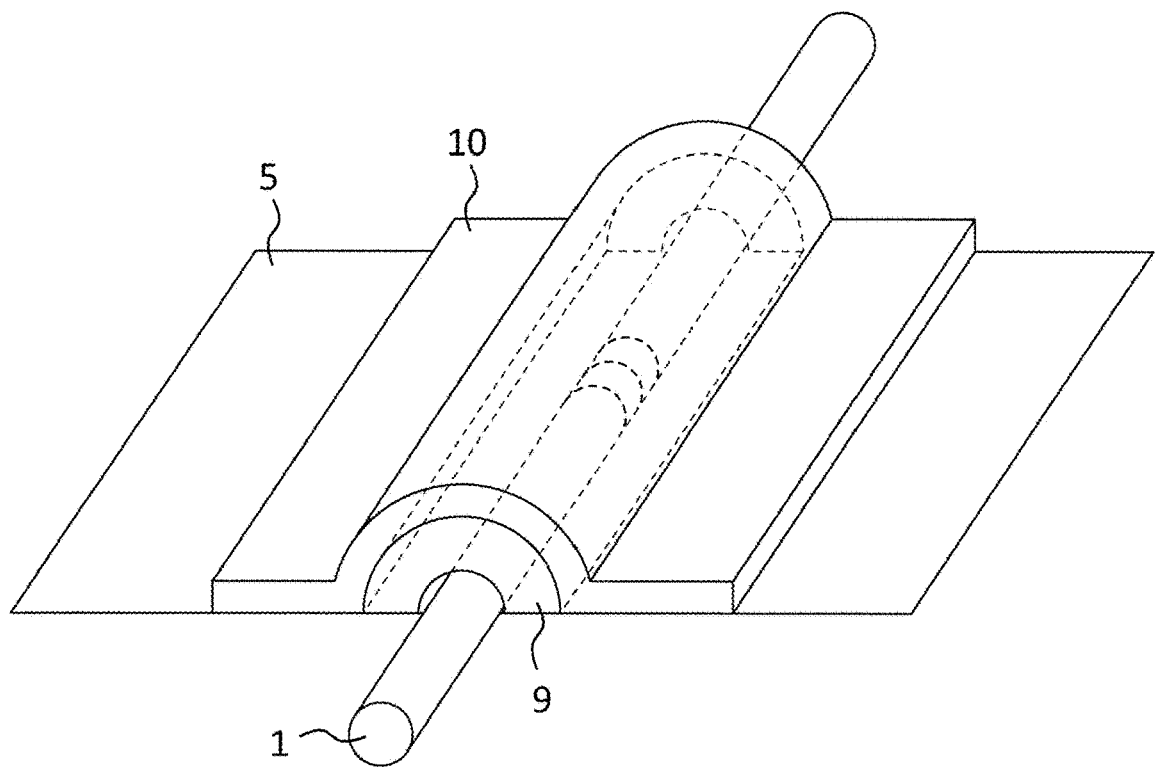
FIG. 9 is a perspective view for illustrating a temperature measurement system according to a first embodiment of this invention.

Next, the temperature measurement system according to the first embodiment is described. FIG. 9 is a perspective view for illustrating the temperature measurement system according to the first embodiment of this invention. In FIG. 9, a temperature measurement system in a case in which the optical fiber 1 is arranged on a straight line is illustrated. The temperature measurement system includes the optical fiber 1, the temperature measurement object 5, an intermediate material 9, and a pressing jig 10.

The optical fiber 1 is provided on the temperature measurement object 5. In FIG. 9, the optical fiber 1 is provided on the upper surface of the temperature measurement object 5, but may be provided on the lower surface of the temperature measurement object 5. The optical fiber 1 has sensitivity to both the temperature and the distortion.

The intermediate material 9 is provided on the temperature measurement object 5. The intermediate material 9 is in contact with the optical fiber 1. The intermediate material 9 restricts movement of the optical fiber 1 in a direction in which the optical fiber 1 is separated away from the temperature measurement object 5.

The pressing jig 10 is provided on the temperature measurement object 5. The pressing jig 10 is fixed to the temperature measurement object 5. The pressing jig 10 holds the optical fiber 1 through intermediation of the intermediate material 9. In other words, the pressing jig 10 holds the optical fiber 1 and the intermediate material 9 such that the optical fiber 1 and the intermediate material 9 are not separated away from the temperature measurement object 5. Further, the pressing jig 10 presses the optical fiber 1 against the temperature measurement object 5 through intermediation of the intermediate material 9. Thus, the optical fiber 1 is pressed toward the temperature measurement object 5.

The pressing jig 10 is required to be firmly fixed to the temperature measurement object 5. Examples of a method of fixing the pressing jig 10 to the temperature measurement object 5 include a method of using a pressure-sensitive adhesive, an adhesive, a screw, or a bolt.

The intermediate material 9 is in contact with the optical fiber 1 such that the optical fiber 1 can freely expand and contract with respect to the temperature measurement object 5 and the intermediate material 9 in the longitudinal direction of the optical fiber 1. In other words, the optical fiber 1 can expand and contract in the longitudinal direction of the optical fiber 1 due to a change in the temperature of the optical fiber 1 with respect to the temperature measurement object 5 and the intermediate material 9.

The intermediate material 9 is formed of a material softer than the pressing jig 10. Thus, distortion that occurs in the temperature measurement object 5 is prevented from being transmitted to the optical fiber 1. Examples of the material forming the intermediate material 9 include a sponge, a foam material, a buffer material, and a fibrous material. Examples of the fibrous material include cotton.

Figure 10:
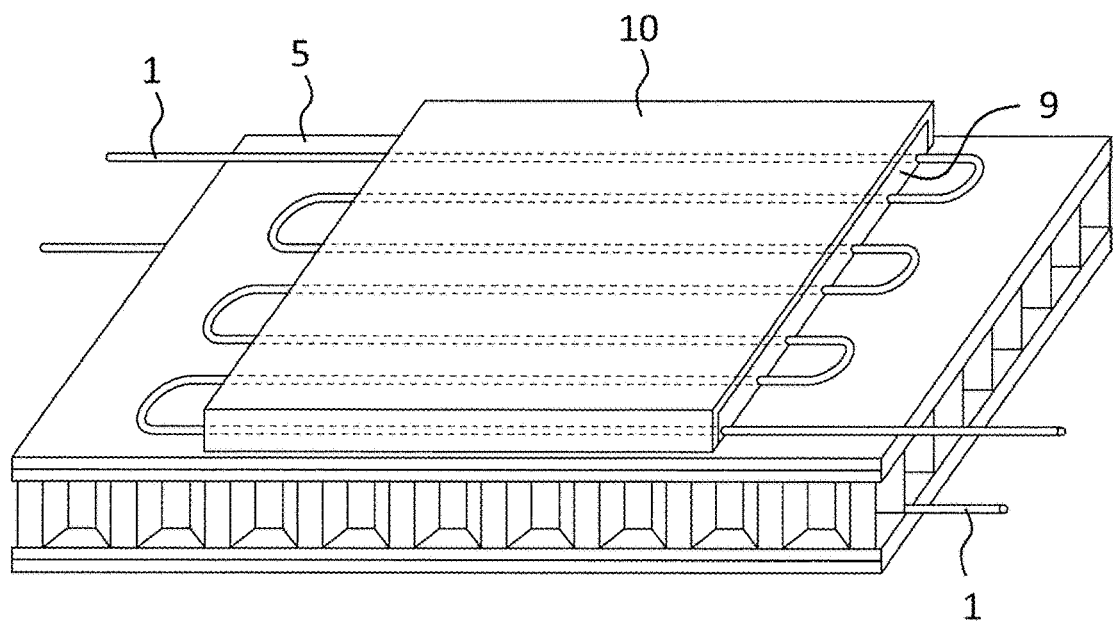
FIG. 10 is a perspective view for illustrating a modification example of the temperature measurement system of FIG. 9.

FIG. 10 is a perspective view for illustrating a modification example of the temperature measurement system of FIG. 9. FIG. 10 is an illustration of a temperature measurement system in a case in which the optical fiber 1 is bent. Further, in FIG. 10, the temperature measurement object 5 is a honeycomb sandwich structure. Also in the temperature measurement system illustrated in FIG. 10, the roles of the intermediate material 9 and the pressing jig 10 are the same as the roles of the intermediate material 9 and the pressing jig 10 in the temperature measurement system illustrated in FIG. 9.

In the temperature measurement system illustrated in each of FIG. 9 and FIG. 10, the optical fiber 1 is not fixed to the temperature measurement object 5. Thus, even when the temperature of the temperature measurement object 5 is changed, and the temperature measurement object 5 expands and contracts, distortion caused by heat generated in the temperature measurement object 5 is not transmitted to the optical fiber 1. Further, the optical fiber 1 is pressed against the temperature measurement object 5. Thus, even when the optical fiber 1 is arranged on any of the upper surface and the lower surface of the temperature measurement object 5, the sensitivity of the temperature measurement by the temperature measurement system is not deteriorated.

Next, the merit of the temperature measurement system in the case in which the temperature measurement object 5 is a honeycomb sandwich structure is described. The honeycomb sandwich structure generally includes skin materials formed of fiber-reinforced plastic and a honeycomb core. With this, the honeycomb sandwich structure has a lightweight and highly rigid structure. Thermal deformation occurs in the honeycomb sandwich structure due to heat input by sunlight, heat generation from a mounted device, or the like. Thus, an earth-directed axis angle in mission instruments such as a camera and an antenna mounted on an artificial satellite is changed. In a geostationary satellite arranged apart from the earth by about 36,000 km, when the earth-directed axis angle is slightly changed, accuracy of Earth observation and accuracy of positioning are significantly reduced. Accordingly, it is important to maintain the temperature of the honeycomb sandwich structure as uniform as possible by thermal control using a heater or the like to prevent thermal deformation of the honeycomb sandwich structure.

As illustrated in FIG. 10, the optical fibers 1 are wired to both the pair of skin materials in the honeycomb sandwich structure being the temperature measurement object 5, thereby being capable of measuring the temperature of the honeycomb sandwich structure with high density and high accuracy. As a result, thermal deformation that occurs in the honeycomb sandwich structure can be prevented by precise thermal control.

Figure 11:
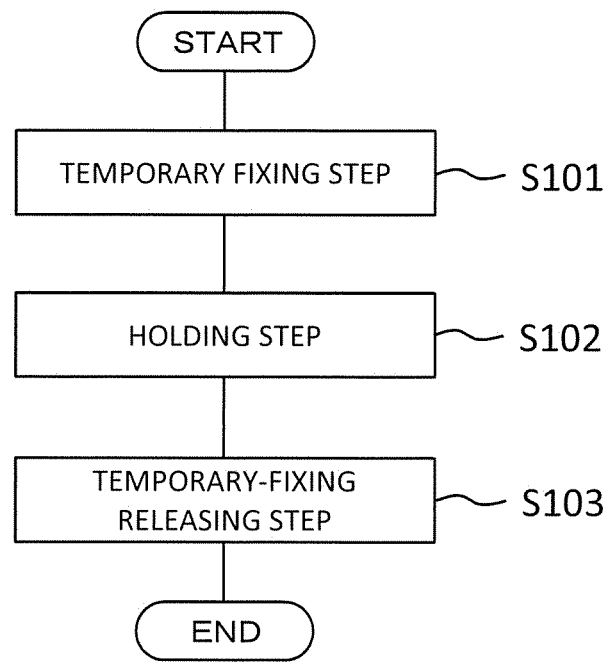
FIG. 11 is a flowchart for illustrating a manufacturing method for a temperature measurement system according to the first embodiment of this invention.
Figure 12:
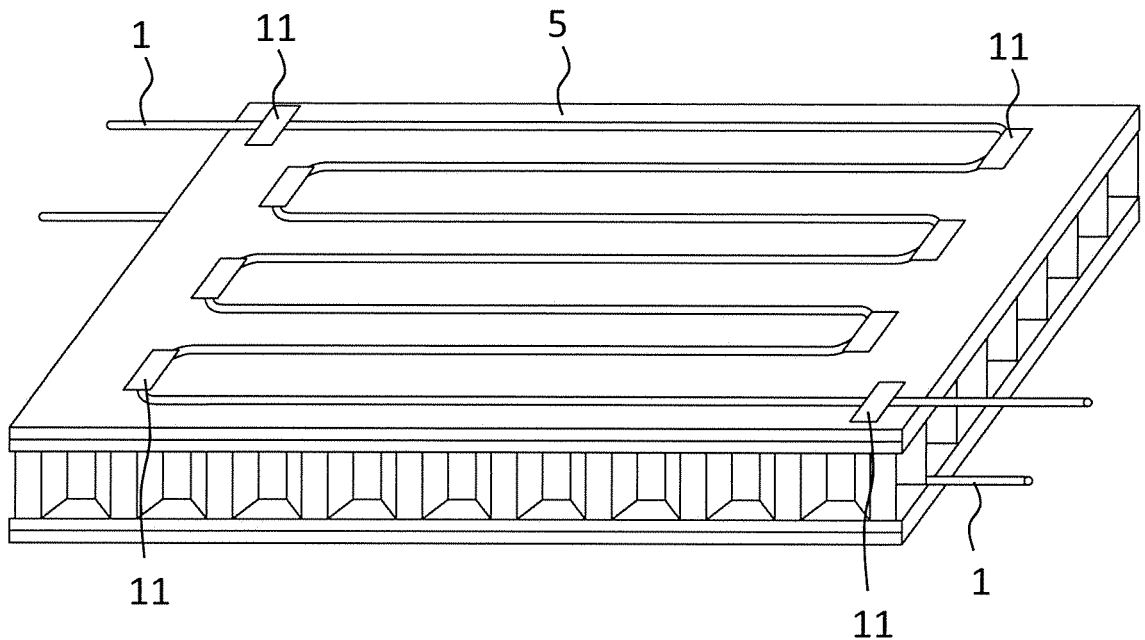
FIG. 12 is an explanatory view for illustrating a temporary fixing step of FIG. 11.

Next, the manufacturing method for the temperature measurement system is described. In this case, the manufacturing method for the temperature measurement system in the case in which the temperature measurement object 5 is a honeycomb sandwich structure is described. FIG. 11 is a flowchart for illustrating the manufacturing method for the temperature measurement system according to the first embodiment of this invention. First, in Step S101, a temporary fixing step is performed. FIG. 12 is an explanatory view for illustrating the temporary fixing step of FIG. 11. In the temporary fixing step, the optical fiber 1 is wired to the skin material of the honeycomb sandwich structure being the temperature measurement object 5, and the optical fiber 1 is temporarily fixed to the honeycomb sandwich structure using tapes 11 being temporary fixing members. Further, in the temporary fixing step, the optical fiber 1 is bent, and the bent portions in the optical fiber 1 are temporarily fixed to the honeycomb sandwich structure using the tapes 11.

Figure 13:
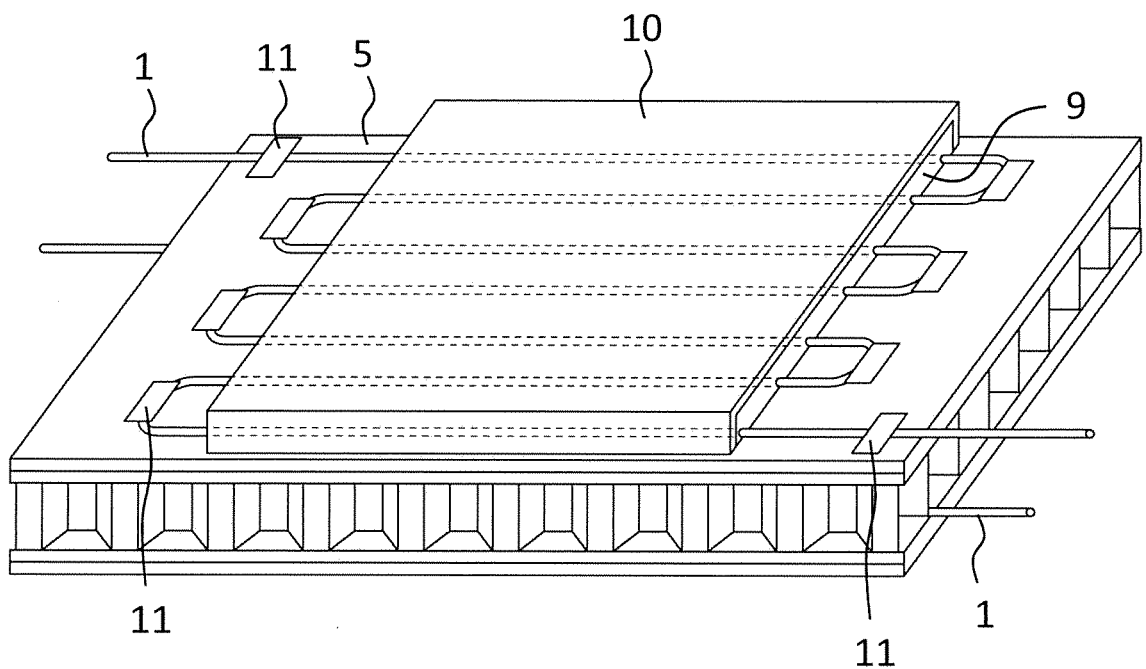
FIG. 13 is an explanatory view for illustrating a holding step of FIG. 11.

After that, as illustrated in FIG. 11, in Step S102, a holding step is performed. FIG. 13 is an explanatory view for illustrating the holding step of FIG. 11. In the holding step, the pressing jig 10 holds the optical fiber 1 through intermediation of the intermediate material 9, and the pressing jig 10 is mounted to the temperature measurement object 5 such that the pressing jig 10 presses the optical fiber 1 against the temperature measurement object 5 through intermediation of the intermediate material 9. In the holding step, the optical fiber 1 can expand and contract in the longitudinal direction of the optical fiber 1 due to the change in the temperature of the optical fiber 1 with respect to the temperature measurement object 5 and the intermediate material 9.

After that, as illustrated in FIG. 11, in Step S103, a temporary-fixing releasing step is performed. In the temporary-fixing releasing step, as illustrated in FIG. 10, the tapes 11 are removed from the optical fiber 1 and the temperature measurement object 5. With this, the temporary fixing of the optical fiber 1 to the temperature measurement object 5 with the tapes 11 is released. In this manner, the manufacture of the temperature measurement system is completed.

As described above, the temperature measurement system according to the first embodiment of this invention includes the temperature measurement object 5 and the optical fiber 1 being provided on the temperature measurement object 5 and having sensitivity to both the temperature and the distortion. Further, the temperature measurement system includes the intermediate material 9 in contact with the optical fiber 1, and the pressing jig 10 that holds the optical fiber 1 through intermediation of the intermediate material 9 and presses the optical fiber 1 against the temperature measurement object 5 through intermediation of the intermediate material 9. The optical fiber 1 can expand and contract in the longitudinal direction of the optical fiber 1 due to the change in the temperature of the optical fiber 1 with respect to the temperature measurement object 5 and the intermediate material 9. With this, the optical fiber 1 can be freely wired without deteriorating the sensitivity of the temperature measurement, and the temperature of the temperature measurement object 5 can be measured with high accuracy and high density. In other words, distortion that occurs in the temperature measurement object 5 can be prevented from being transmitted to the optical fiber 1, and the responsiveness of the heat transfer from the temperature measurement object 5 to the optical fiber 1 can be improved.

In the first embodiment, the configuration of the optical fiber 1 including the FBG sensor unit 102 is described. However, the present invention is not limited thereto, and other multipoint optical fibers 1 and distributed optical fibers 1 may be employed.

Further, in the modification example of the first embodiment, the honeycomb sandwich structure is described as an example of the temperature measurement object 5. However, the present invention is not limited thereto, and the temperature measurement object 5 can be applied to other satellite-mounted devices.

Second Embodiment

Figure 14:
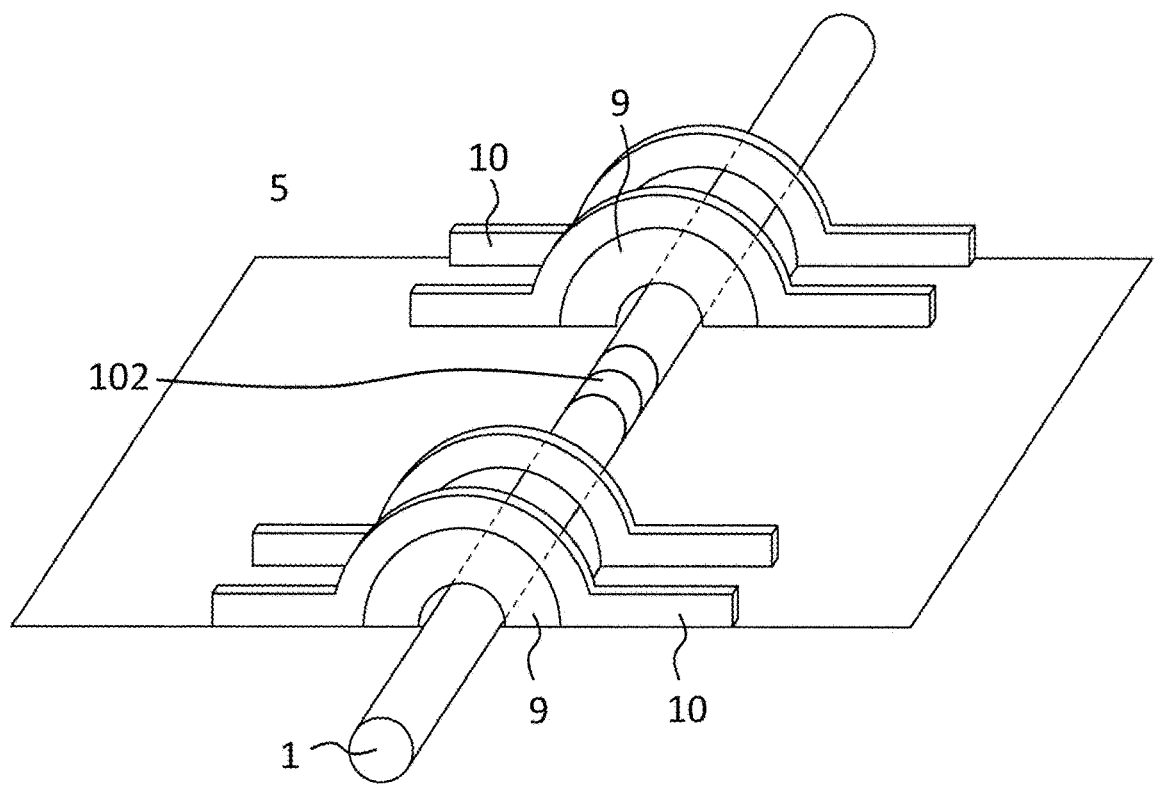
FIG. 14 is a perspective view for illustrating a temperature measurement system according to a second embodiment of this invention.

FIG. 14 is a perspective view for illustrating a temperature measurement system according to a second embodiment of this invention. In the first embodiment, the configuration in which the FBG sensor unit 102 is covered with the pressing jig 10 is described. In contrast, in the second embodiment, the optical fiber 1 is held by a pair of short pressing jigs 10. The FBG sensor unit 102 is not covered with the pressing jig 10. With this, the configuration of the temperature measurement system is simplified.

Figure 15:
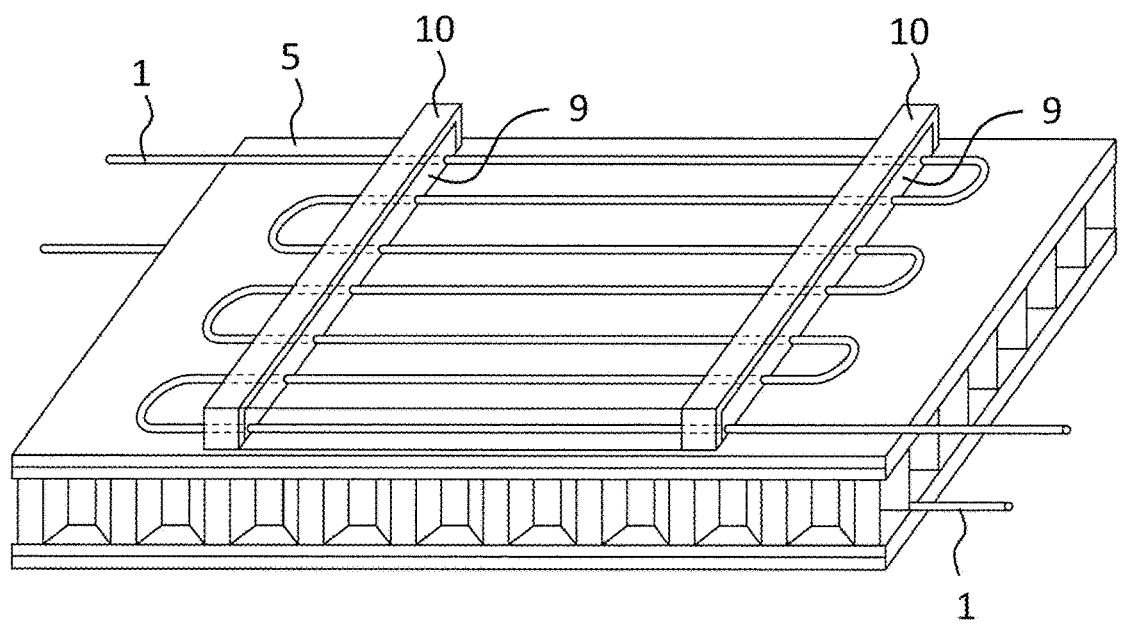
FIG. 15 is a perspective view for illustrating a modification example of the temperature measurement system of FIG. 14.

FIG. 15 is a perspective view for illustrating a modification example of the temperature measurement system of FIG. 14. FIG. 15 is an illustration of a temperature measurement system in a case in which the optical fiber 1 is bent. Further, in FIG. 15, the temperature measurement object 5 is a honeycomb sandwich structure.

In the temperature measurement system according to the first embodiment, the entire FBG sensor unit 102 of the optical fiber 1 is covered with the pressing jig 10. In contrast, in the temperature measurement system illustrated in each of FIG. and FIG. 15, the optical fiber 1 is held by the pair of pressing jigs 10 such that the optical fiber 1 is not separated away from the temperature measurement object 5. In the temperature measurement system according to the second embodiment, the volume of the intermediate material 9 and the pressing jig 10 is smaller than that of the temperature measurement system according to the first embodiment. Other configurations are the same as those of the first embodiment.

As described above, with the temperature measurement system according to the second embodiment of this invention, each of the pair of pressing jigs 10 holds the optical fiber 1 through intermediation of the intermediate material 9. With this, the same effects as those of the first embodiment can be obtained, and as compared to the first embodiment, the configuration of the temperature measurement system can be simplified.

Third Embodiment

Figure 16:
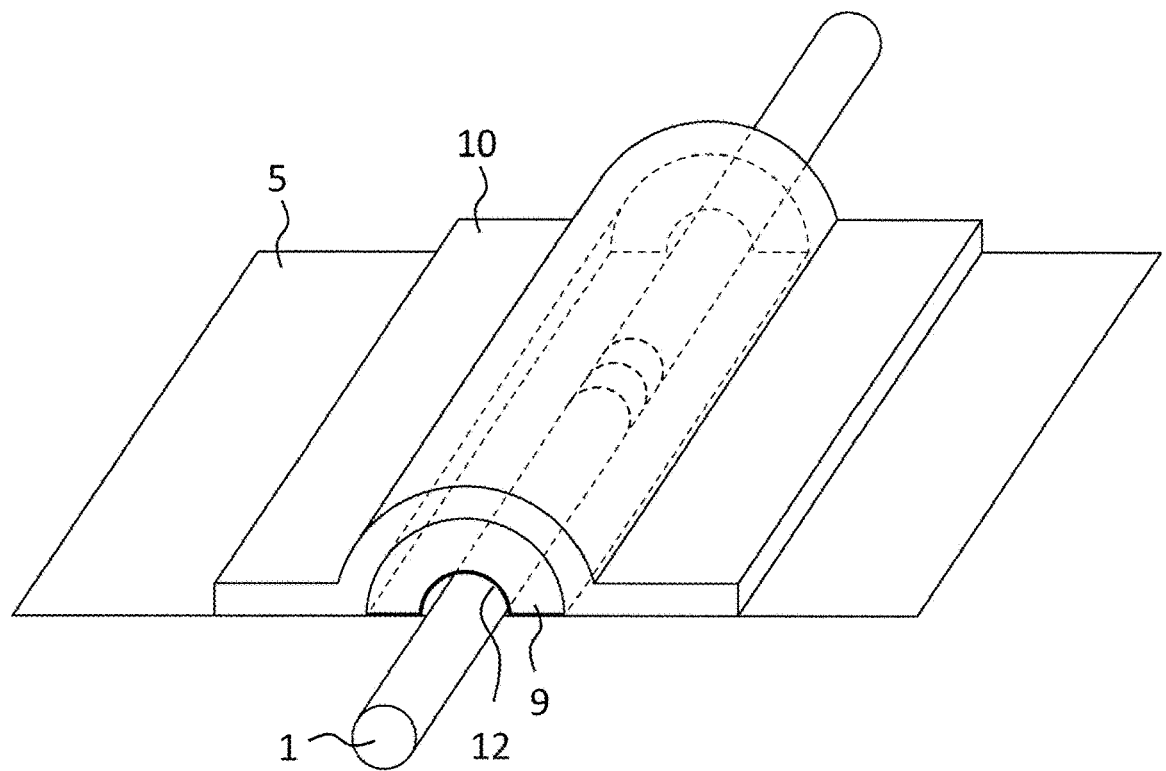
FIG. 16 is a perspective view for illustrating a temperature measurement system according to a third embodiment of this invention.

FIG. 16 is a perspective view for illustrating a temperature measurement system according to a third embodiment of this invention. In the first embodiment, the configuration in which the optical fiber 1 is arranged between the temperature measurement object 5 and the intermediate material 9 is described. In contrast, in the third embodiment, a paste-like substance 12 is provided around the optical fiber 1. Thus, the paste-like substance 12 is provided in a gap between the optical fiber 1 and the intermediate material 9 and a gap between the temperature measurement object 5 and the intermediate material 9. The paste-like substance 12 adheres to the temperature measurement object 5, the optical fiber 1, and the intermediate material 9.

As the paste-like substance 12, one having an NLGI consistency number of 00 or more and 5 or less is used. An adhesion step of allowing the paste-like substance 12 to adhere to the temperature measurement object 5 and the optical fiber 1 is performed after the temporary fixing step and before the holding step. With the holding step, the paste-like substance 12 adheres to the intermediate material 9.

Figure 17:
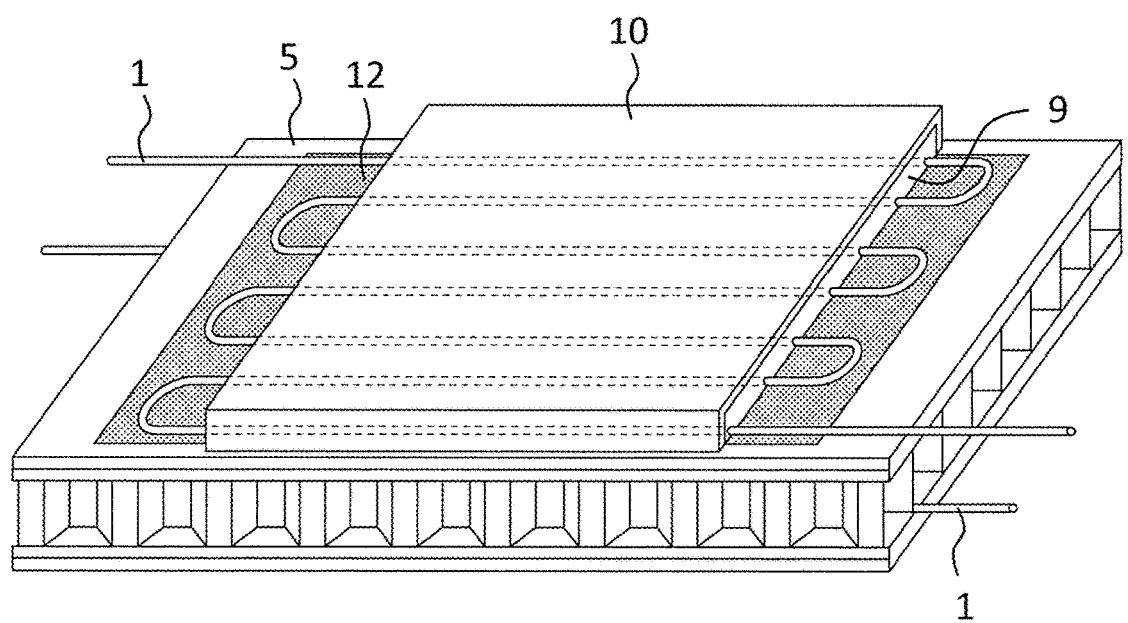
FIG. 17 is a perspective view for illustrating a modification example of the temperature measurement system of FIG. 16.

FIG. 17 is a perspective view for illustrating a modification example of the temperature measurement system of FIG. 16. In FIG. 17, a temperature measurement system in a case in which the optical fiber 1 is bent is illustrated. Further, in FIG. 17, the temperature measurement object 5 is a honeycomb sandwich structure.

In the temperature measurement system according to the first embodiment, the optical fiber 1 is arranged between the temperature measurement object 5 and the intermediate material 9. Thus, in the temperature measurement system according to the first embodiment, a gap may be formed by the temperature measurement object 5, the optical fiber 1, and the intermediate material 9. In contrast, in the temperature measurement system illustrated in each of FIG. 16 and FIG. 17, the paste-like substance 12 is provided around the optical fiber 1. The paste-like substance 12 adheres to the temperature measurement object 5, the optical fiber 1, and the intermediate material 9. With this, the optical fiber 1 is firmly held on the temperature measurement object 5, and heat is easily transferred from the temperature measurement object 5 to the optical fiber 1. Other configurations are the same as those of the first embodiment. The other configurations may be the same as those of the second embodiment.

As described above, the temperature measurement system according to the third embodiment of this invention includes the paste-like substance 12 which adheres to the temperature measurement object 5 and the optical fiber 1. With this, the optical fiber 1 is firmly held on the temperature measurement object 5, and heat is easily transferred from the temperature measurement object 5 to the optical fiber 1.

Fourth Embodiment

Figure 18:
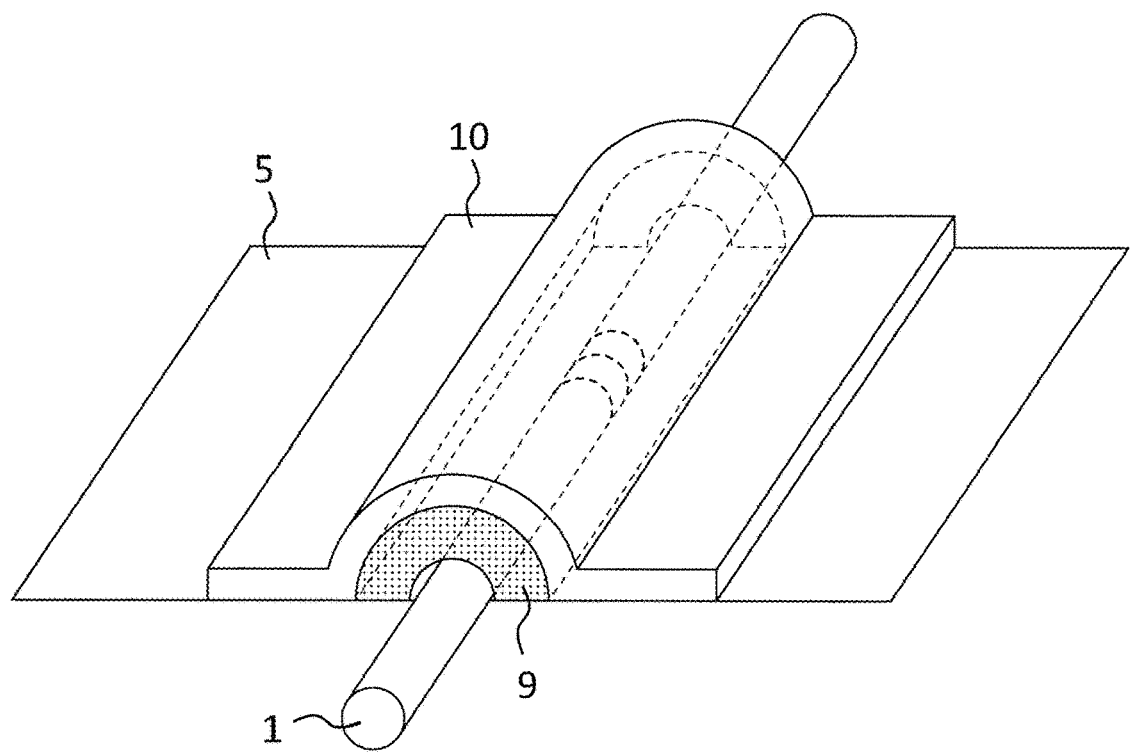
FIG. 18 is a perspective view for illustrating a temperature measurement system according to a fourth embodiment of this invention.

FIG. 18 is a perspective view for illustrating a temperature measurement system according to a fourth embodiment of this invention. In the third embodiment, the configuration in which, after the paste-like substance 12 adheres around the optical fiber 1, the intermediate material 9 is provided on the optical fiber 1 is described. In contrast, in the fourth embodiment, a paste-like substance is infiltrated into the intermediate material 9. The paste-like substance in the fourth embodiment is the same as the paste-like substance in the third embodiment.

Figure 19:
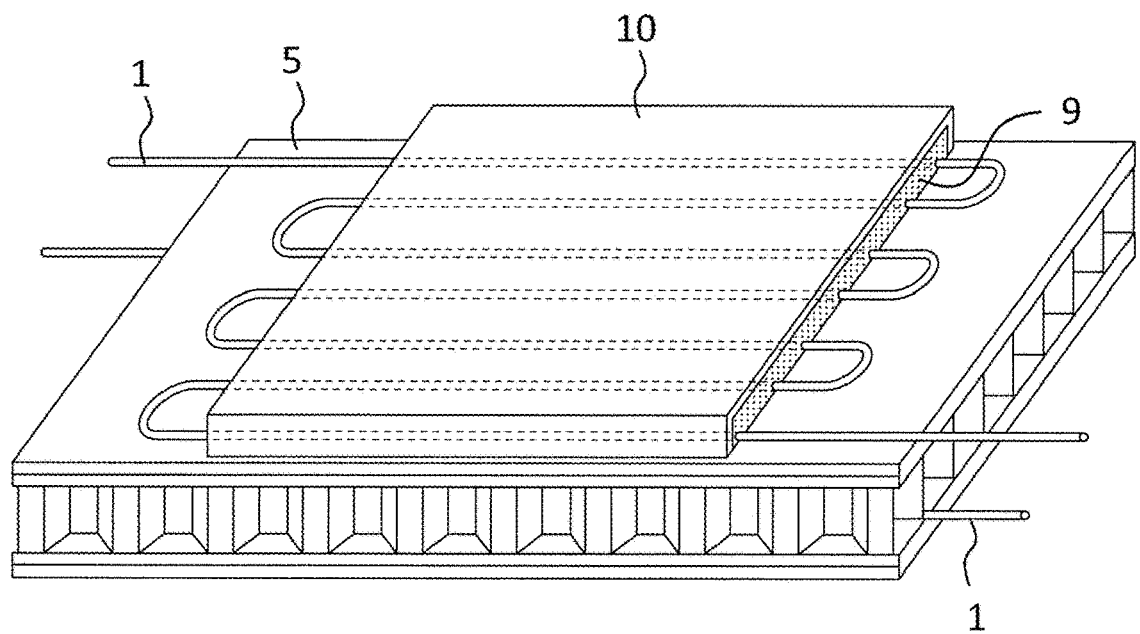
FIG. 19 is a perspective view for illustrating a modification example of the temperature measurement system of FIG. 18.

FIG. 19 is a perspective view for illustrating a modification example of the temperature measurement system of FIG. 18. In FIG. 19, a temperature measurement system in the case in which the optical fiber 1 is bent is illustrated. Further, in FIG. 19, the temperature measurement object 5 is a honeycomb sandwich structure.

In the temperature measurement system according to the third embodiment, the paste-like substance 12 adheres to the temperature measurement object 5 and the optical fiber 1 so that the optical fiber 1 is held on the pressing jig 10 through intermediation of the intermediate material 9. In contrast, in the temperature measurement system illustrated in each of FIG. 18 and FIG. 19, the intermediate material 9 containing the paste-like substance infiltrated therein covers the periphery of the optical fiber 1. With the intermediate material 9 containing the paste-like substance infiltrated therein, the optical fiber 1 is firmly held on the temperature measurement object 5, and heat is easily transferred from the temperature measurement object 5 to the optical fiber 1. Other configurations are the same as those of the third embodiment.

As described above, with the temperature measurement system according to the fourth embodiment of this invention, the paste-like substance is infiltrated into the intermediate material 9. With this, the optical fiber 1 is firmly held on the temperature measurement object 5, and heat is easily transferred from the temperature measurement object 5 to the optical fiber 1.

REFERENCE SIGNS LIST 1 optical fiber, 2 optical circulator, 3 ASE light source, 4 spectrum analyzer, 5 temperature measurement object, 6 protective tube, 7 conductive viscous material, 8 casing, 9 intermediate material, 10 pressing jig, 11 tape, 12 paste-like substance, 81 inlet portion, 82 outlet portion, 101 core, 102 FBG sensor unit, 103 cladding, 104 covering portion, 105 cover removed portion

The invention claimed is:

1. A temperature measurement system, comprising:
   a temperature measurement object;
   an optical fiber provided on the temperature measurement object;
   an intermediate material which is provided on the optical fiber, the intermediate material containing a paste-like substance infiltrated into the intermediate material; and
   a pressing jig which is provided on the temperature measurement object, the pressing jig being for pressing the optical fiber against the temperature measurement object through intermediation of the intermediate material,
   wherein the optical fiber is expandable and contractible in a longitudinal direction of the optical fiber due to a change in a temperature of the optical fiber with respect to the temperature measurement object and the intermediate material, and
   wherein the intermediate member includes one of a sponge, a foam material, and a fibrous material.

2. The temperature measurement system according to claim 1, wherein the paste-like substance has an NLGI consistency number of 00 or more and 5 or less.

3. The temperature measurement system according to claim 2, wherein the intermediate material is formed of a material softer than the pressing jig.

4. The temperature measurement system according to claim 3, wherein the temperature measurement object is a honeycomb sandwich structure.

5. The temperature measurement system according to claim 2, wherein the pressing jig is fixed to the temperature measurement object using a pressure-sensitive adhesive, an adhesive, a screw, or a bolt.

6. The temperature measurement system according to claim 5, wherein the temperature measurement object is a honeycomb sandwich structure.

7. The temperature measurement system according to claim 3, wherein the pressing jig is fixed to the temperature measurement object using a pressure-sensitive adhesive, an adhesive, a screw, or a bolt.

8. The temperature measurement system according to claim 7, wherein the temperature measurement object is a honeycomb sandwich structure.

9. The temperature measurement system according to claim 2, wherein the temperature measurement object is a honeycomb sandwich structure.

10. The temperature measurement system according to claim 1, wherein the intermediate material is formed of a material softer than the pressing jig.

11. The temperature measurement system according to claim 10, wherein the pressing jig is fixed to the temperature measurement object using a pressure-sensitive adhesive, an adhesive, a screw, or a bolt.

12. The temperature measurement system according to claim 11, wherein the temperature measurement object is a honeycomb sandwich structure.

13. The temperature measurement system according to claim 10, wherein the temperature measurement object is a honeycomb sandwich structure.

14. The temperature measurement system according to claim 1, wherein the pressing jig is fixed to the temperature measurement object using a pressure-sensitive adhesive, an adhesive, a screw, or a bolt.

15. The temperature measurement system according to claim 14, wherein the temperature measurement object is a honeycomb sandwich structure.

16. The temperature measurement system according to claim 1, wherein the temperature measurement object is a honeycomb sandwich structure.

17. The temperature measurement system according to claim 1, wherein the pressing jig is firmly fixed to the temperature measurement object via a pressure-sensitive adhesive, an adhesive, a screw, or a bolt.

18. The temperature measurement system according to claim 1, wherein the optical fiber includes an Fiber Bragg Grating (FBG) sensor, and
    the FBG sensor is covered by the pressing jig.

19. The temperature measurement system according to claim 1, wherein the intermediate member forms a semi-circular shape, and
    the pressing jig includes a semi-circular shaped portion and two flat portions extending from the semi-circular shaped portion.

20. A manufacturing method for a temperature measurement system, comprising:
    a temporary fixing step of temporarily fixing an optical fiber to a temperature measurement object using a temporary fixing member;
    a holding step of pressing, by a pressing jig, the optical fiber against the temperature measurement object through intermediation of an intermediate material by mounting the pressing jig to the temperature measurement object after the temporary fixing step; and
    a temporary-fixing releasing step of releasing the temporary fixing of the optical fiber to the temperature measurement object by the temporary fixing member after the holding step,
    wherein, in the holding step, the optical fiber is expandable and contractible in a longitudinal direction of the optical fiber due to a change in a temperature of the optical fiber with respect to the temperature measurement object and the intermediate material,
    wherein the intermediate material contains a paste-like substance infiltrated into the intermediate material, and
    wherein the intermediate member includes one of a sponge, a foam material, and a fibrous material.

* * * * *